United States Patent [19]

Riemenschneider et al.

[11] Patent Number: 4,998,614
[45] Date of Patent: Mar. 12, 1991

[54] CONVEYOR DISCHARGE CONTROL

[75] Inventors: Mark R. Riemenschneider, Maplewood; James P. Ralidak, Wyoming, both of Minn.

[73] Assignee: R. A. Jones & Co. Inc., Covington, Ky.

[21] Appl. No.: 311,075

[22] Filed: Feb. 14, 1989

[51] Int. Cl.⁵ .............................................. B65G 47/26
[52] U.S. Cl. ................... 198/463.4; 198/464.2
[58] Field of Search ............ 198/463.4, 463.5, 464.2, 198/460; 193/35 A, 40, 35 R; 221/289

[56] References Cited

U.S. PATENT DOCUMENTS

| 2,288,621 | 7/1942 | Greer | 198/463.4 |
| 2,405,947 | 8/1946 | Gettig et al. | 198/463.4 |
| 3,106,279 | 10/1963 | Cross | 198/463.4 |
| 3,536,179 | 10/1970 | Pearson | 198/463.4 X |
| 3,771,633 | 11/1973 | Bezrukov et al. | 193/35 A |
| 4,231,465 | 11/1980 | Bourgeois | 198/463.4 X |
| 4,265,357 | 5/1981 | Amberg et al. | 198/460 |
| 4,646,909 | 3/1987 | vom Stein | 198/463.4 X |
| 4,799,583 | 1/1989 | Simelunas et al. | 198/463.4 X |

FOREIGN PATENT DOCUMENTS

| 0237465 | 8/1911 | Fed. Rep. of Germany | 198/463.4 |
| 1393718 | 5/1988 | U.S.S.R. | 193/35 R |

Primary Examiner—D. Glenn Dayoan
Attorney, Agent, or Firm—Wood, Herron & Evans

[57] ABSTRACT

Apparatus and method for controlling the discharge of packages from a conveyor utilizing a rotary stop having a generally planar first surface selectively positionable to blocking and discharge positions; in one embodiment, the rotary stop further having a generally volute-shaped second surface connecting edges of the first surface such that the first surface blocks package discharge when the stop is in the blocking position and the second surface permits discharge when the stop is in the discharge position, and in another embodiment the rotary stop having a generally finger-shaped projection, one side of which forms the first surface. A separate ejector is provided to complete discharge of partially discharged packages by pushing such packages off the conveyor.

17 Claims, 3 Drawing Sheets

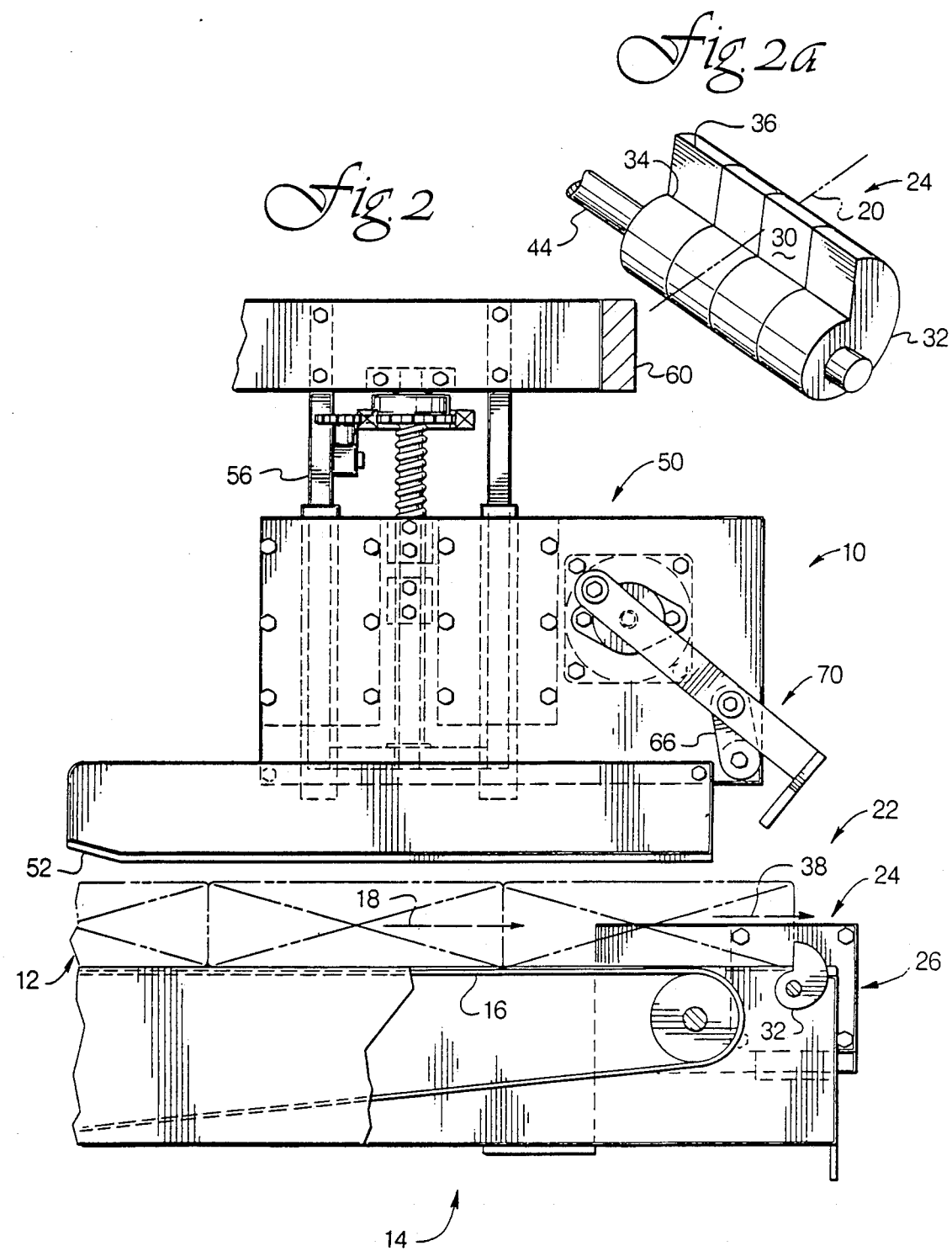

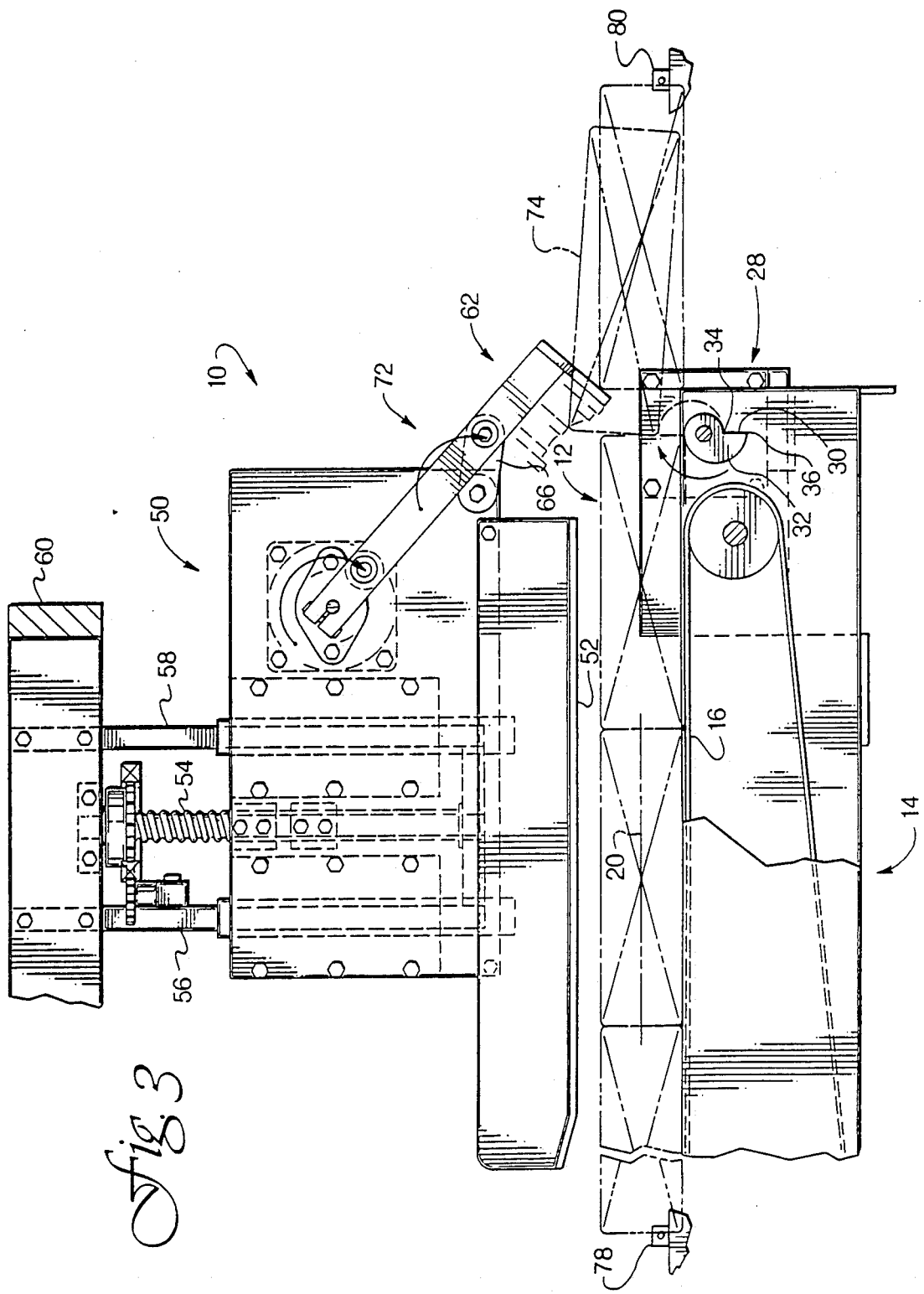

CONVEYOR DISCHARGE CONTROL

FIELD OF THE INVENTION

This invention relates to the field of conveyors, and more particularly to apparatus for controlling the discharge of packages from the downstream end of such a conveyor.

BACKGROUND OF THE INVENTION

This invention relates to apparatus which controls or meters the delivery of packages from a conveyor to subsequent equipment for, e.g., cartoning of such packages. In connection with such processing, it has been found preferable to control the release of packages from a feed conveyor, allowing retiming of package delivery to subsequent equipment. This may be accomplished by retaining packages on the conveyor in a controlled fashion, and Periodically releasing one or more packages from the conveyor as needed for subsequent processing. In that connection, it has been found desirable to positively retain the packages when discharge is to be blocked, and to permit discharge when packages are to be delivered from the conveyor. Furthermore, it has been found preferable to have a smooth transition between these two states, and further, it has also been found preferable to provide an ejector or pusher apparatus separate from the conveyor to complete or assist a discharge which may be only partially accomplished by the conveyor itself.

BRIEF DESCRIPTION OF THE DRAWINGS

FIG. 2 is a side elevation view of the structure of FIG. 1 with parts cut away.

FIG. 2a is a perspective view of a rotary stop means useful in the practice of this invention.

FIG. 2b is a perspective view of an alternative embodiment of the rotary stop means.

FIG. 3 is a view similar to FIG. 2, but with some moveable parts shown in alternate positions.

FIG. 3a is a fragmentary side elevation view of an alternative embodiment of the ejector apparatus shown in FIG. 3.

DETAILED DESCRIPTION

Figure 1:
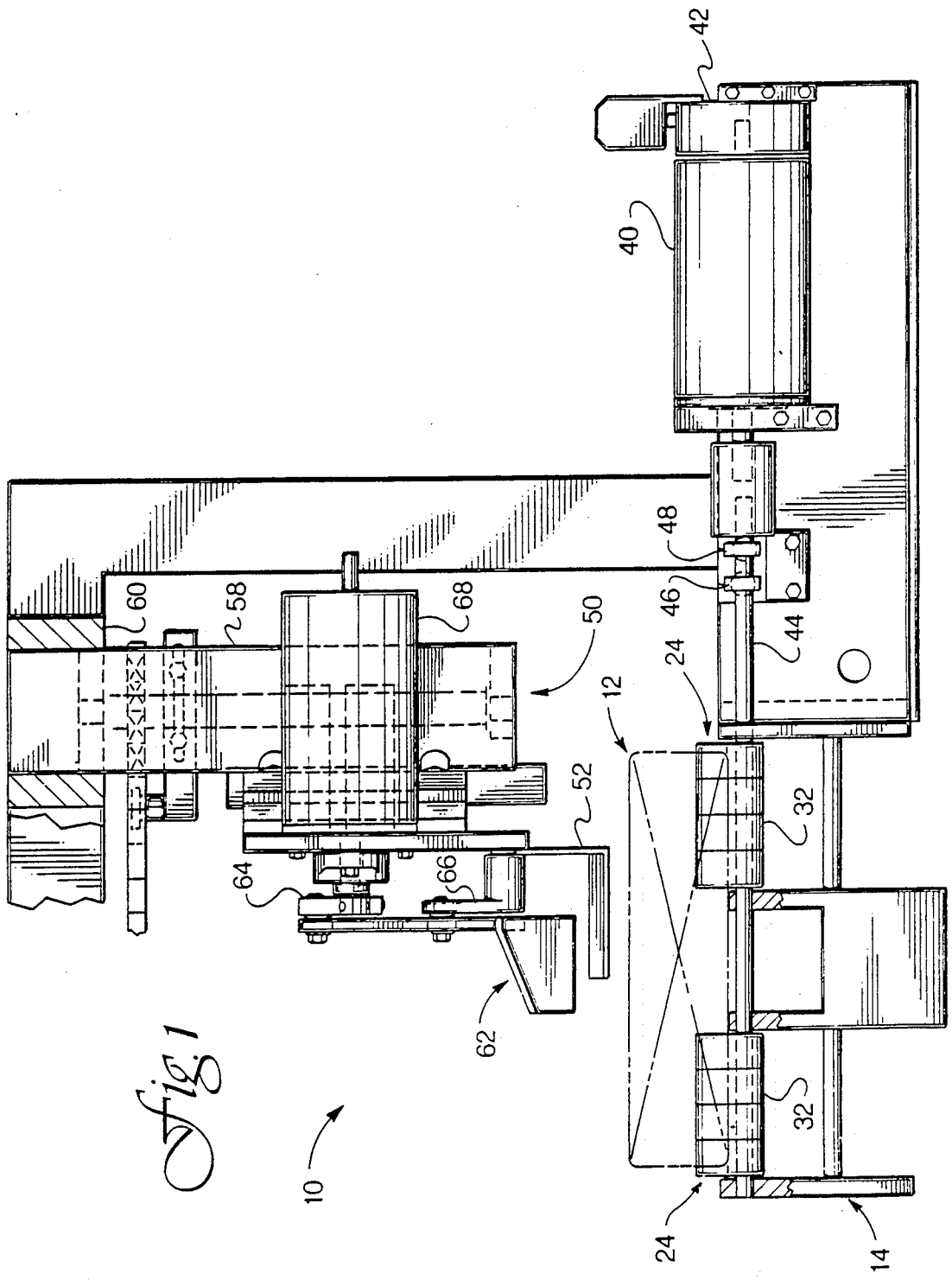
FIG. 1 is a discharge end elevation view with parts cut away of the conveyor discharge control apparatus.

Referring to the figures, a conveyor discharge control apparatus 10 may be seen. Apparatus 10 is especially useful in controlling the discharge of packages 12 from a conveyor 14. Conveyor 14 preferably has a belt 16 suitable for advancing packages 12 in a longitudinal direction 18 along a longitudinal axis 20 of conveyor 14. Packages 12 advance toward the downstream end 22 of conveyor 14 when driven by belt 16 unless and until blocked by a rotary stop means 24. Rotary stop 24 is shown in a first or blocking position 26 in FIGS. 1 and 2, and in a second or discharge position 28 in FIG. 3. Referring also to FIG. 2a, rotary stop 24 preferably has a generally planar first surface 30 positioned transverse to longitudinal axis 20 when stop 24 is in the blocking position 26. Stop 24 preferably further has a generally volute-shaped second surface 32. Second surface 32 is preferably an increasing radius cylindrical surface having a starting edge 34 and a finishing edge 36 preferably joined to corresponding edges of the first surface 30.

When it is desired to release packages 12 through a discharge path 38 of conveyor 14, a stepper motor 40 under control of a digital rotation step monitor and control 42 will actuate rotary stop means 24 from the actuated or blocking position to the deactuated or discharge position and vice versa via shaft 44. The position of the rotary stop means 24 is determined by a pair of rotation sensors 46, 48. It is to be understood that alternative means to stepper motor 40 and control 42 may be utilized in the practice of this invention to position stop 24 to the blocking and discharge positions 26, 28 respectively.

Referring now to FIG. 2b, an alternative embodiment 124 of the rotary stop means 24 may be seen. Rotary stop means 124 is shown in a blocking position 126 by solid lines and in a discharge position 128 by phantom lines. Rotary stop means 124 preferably has a planar surface 130 corresponding to planar surface 30 of stop means 24. In operation, stop means 124 is bidirectionally reciprocated between positions 126 and 128 which are preferably 72° apart. It has been found that using such bidirectional motion for stop means 124 permits higher speeds of operation of apparatus 10.

An overhead assembly 50 has an overhead guard 52 which is adjustably positioned by means of a ball screw 54 preferably to be in relatively close proximity to packages 12. Assembly 50 is movable along pusher frame members 56, 58 so as to be vertically positionable with respect to machine frame 60 to accommodate various heights of packages 12.

Overhead assembly 50 further includes a pusher arm member 62 mounted to assembly 50 by bell crank 64 and swing arm 66 for pivoting relationship with assembly 50. Bell crank 64 is preferably driven by a motor 68 from a home position 70 as shown in FIG. 2, through an extended position 72 as shown in FIG. 3, and back to home position 70. The purpose of pusher arm or ejector means 62 is to provide means for completing discharge of a partially discharged package 74 in the discharge path 38 of conveyor 14, as shown in FIG. 3, since subsequent processing may not fully extract a partially discharged package 74. Arm or ejector 62 advances package 74 to a position 76 free of the downstream end 22 of conveyor 14. Pusher arm member 62 preferably has a mounting portion 63 and a paddle 65 affixed thereto.

Referring now to FIG. 3a, in an alternative embodiment, a brush 82 replaces paddle 65 on mounting portion 63. Brush 82 preferably has a plurality of bristles 84 which have been found to be preferable in certain aspects to paddle 65. Bristles 84 may be formed of nylon, and are desirably sufficiently stiff to assist ejection or discharge of packages 12, while at the same time sufficiently resilient to avoid damaging packages 12.

Apparatus 10 further preferably includes a first sensor 78 positioned upstream from end 22 of conveyor 14 for detecting when at least a predetermined number of packages 12 are available for discharge from conveyor 14, since it may be desirable to suspend package discharge operation unless a minimum number of packages are available on conveyor 14. Such operation has been found to be desirable, for example, when the discharged packages are to be stacked in multiple package layers downstream of conveyor 14 and the minimum number of packages are needed to form a complete layer for orderly stacking.

A second sensor 80 is preferably positioned a predetermined distance downstream of end 22 of conveyor 14 to control the operation of stop means 24. When sensor 80 detects the absence of a package 12, control 42 commands motor or actuator 40 to move stop 24 (or 124) from the blocking position 26 (126) to the discharge position 28 (128). Once sensor 80 detects the presence of a package 12, control 42 commands motor 40 to move stop 24 (or 124) from the discharge position 28 (128) to the blocking position 26 (126). Any partially discharged package 74 will be fully discharged by ejector 62 (or 82). It is to be understood that a further feature of the embodiment shown in FIG. 3a is that the extended character of brush 82 will tend to restrain packages from moving out of the discharge path, in much the same way as overhead guard 52 does. This is relatively more important when packages 12 contain relatively light contents, such as cereal, in comparison to relatively heavy contents, such as laundry detergent powder, since relatively light packages may be more easily displaced out of the discharge path by stop means 24 or 124.

Sensors 78 and 80 may utilize photo electric, proximity or other conventional sensing techniques to sense the presence and absence of packages 12.

The invention is not to be taken as limited to all of the details thereof as modifications and variations thereof may be made without departing from the spirit or scope of the invention.

What is claimed is:

1. Apparatus for controlling the discharge of a package conveyor comprising rotary stop means located at a downstream end of said package conveyor having
   (a) a generally planar first surface transverse to an axis of the conveyor,
   (b) a generally volute-shaped second surface connecting a pair of opposed edges of the first surface, and
   (c) an axis of rotation transverse to the longitudinal axis of the conveyor,
wherein the rotary stop means is selectively positionable to a blocking position for blocking discharge of packages from the conveyor and a discharge position for allowing discharge of packages from the conveyor and wherein the rotary stop means presents the second surface over which packages pass when the stop means moves between the discharge and blocking positions.

2. The apparatus of claim 1 further comprising pusher means for discharging a package partially resting on the second surface of the stop means when the stop means is intermediate the discharge and blocking positions.

3. The apparatus of claim 1 further comprising sensor means positioned a predetermined number of packages upstream of the downstream end of the conveyor and connected to said rotary stop means for suspending package discharge operation in the absence of the predetermined number of packages on the conveyor.

4. The apparatus of claim 1 further comprising sensor means positioned a predetermined distance downstream of the downstream end of conveyor and connected to said rotary stop means to control the operation of the rotary stop means. in the absence of the predetermined number of packages on the conveyor.

5. A method of controlling discharge of packages from a conveyor comprising the steps of:
   (a) blocking package discharge by opposing package movement longitudinal of a conveyor by selectively rotatably interposing a generally planar first surface of a stop means in a first position transverse to a discharge path of the conveyor at a downstream end thereof;
   (b) permitting package discharge by selectively rotating the stop means such that the first surface thereof is moved out of the discharge path; and
   (c) blocking package discharge by selectively further rotating the stop means to gradually interpose a volute-shaped second surface of the stop means until the first surface reaches the first position.

6. The method of claim 5 further comprising the additional step:
   (d) discharging a package partially resting on the second surface of the stop means generally along the discharge path of the conveyor.

7. The method of claim 5 further comprising an additional step (a1) intermediate steps (a) and (b):
   (a1) sensing the absence of a package downstream of the conveyor.

8. The method of claim 5 further comprising the step of suspending package discharge operation when less than a predetermined number of packages are available for discharge on the conveyor.

9. In a package conveyor of this type having longitudinally extending belts for moving packages along the conveyor, the improvement of a conveyor discharge apparatus in combination therewith comprising discharge stop means having first and second surfaces forming the exterior of the discharge stop means and selectively positionable into and out of a discharge path of the conveyor for selectively blocking and permitting packages to be discharged from the conveyor wherein the second surface is a smoothly varying-radius cylinder having a volute cross-section and the first surface is an abrupt discontinuity in the cylinder such that packages are:
   (i) blocked from discharge from the conveyor when the first surface is positioned in the discharge path. and
   (ii) permitted to discharge from the conveyor when the first surface is positioned out of the discharge path.

10. The combination of claim 9 wherein the discharge stop means further comprises an axis transverse to the conveyor wherein the stop means is positionable about the axis.

11. The combination of claim 9 further comprising a pusher means for completing discharge of a partially discharged package in the discharge path of the conveyor.

12. The combination of claim 9 further comprising a sensor positioned upstream of a downstream end of the conveyor and coupled to the discharge stop means for interrupting discharge of packages when less than a predetermined number are present on the conveyor.

13. The combination of claim 12 further comprising an additional sensor positioned downstream of the downstream end of the conveyor and coupled to the discharge stop means for selectively positioning the discharge stop means into and out of the discharge path in response to sensing, respectively, the presence and absence of a package at the additional sensor.

14. In a package conveyor of the type having longitudinally extending belts for moving packages along the conveyor, the improvement of a conveyor discharge apparatus in combination therewith comprising discharge stop means having a finger-shaped projection with a first surface forming a planar surface on the stop means and selectively positionable into and out of perpendicularity with a discharge path of the conveyor for selectively blocking and permitting packages to be discharged from the conveyor such that packages are:
  (i) blocked from discharge from the conveyor when the first surface is positioned in perpendicularity to the discharge path, and
  (ii) permitted to discharge from the conveyor when the first surface is positioned out of perpendicularity to the discharge path, said stop means also having a second surface which is adapted to engage a trailing bottom portion of a partially discharged package so as to lift said trailing portion relative to an adjacent upstream package, and ejector means for completing discharge of said partially discharged package in the discharge path of the conveyor.

15. The combination of claim 14 wherein the ejector means comprises a paddle selectively positionable into and out of engagement with the partially discharged package.

16. The combination of claim 14 wherein the ejector means comprises a brush bristles selectively positionable into and out of engagement with the partially discharged package.

17. Apparatus for controlling the discharge of a package conveyor comprising rotary stop means located at a downstream end of said package conveyor:
  (a) an axis of rotation transverse to the longitudinal axis of the conveyor, and
  (b) a finger-shaped projection means extending away from the axis of rotation and having a generally planar first surface transverse to an axis of the conveyor, wherein the rotary stop means is selectively positionable to a blocking position for blocking discharge of packages from the conveyor and a discharge position for allowing discharge of packages from the conveyor,
  said rotary stop means presenting a second surface to packages when said stop means is intermediate the discharge and blocking positions,
  and pusher means for discharging a package partially resting on the second surface of said stop means when said stop means is in the blocking position.

* * * * *